United States Patent
Bissantz

(10) Patent No.: US 8,593,461 B2
(45) Date of Patent: Nov. 26, 2013

(54) METHOD FOR THE GRAPHICAL DISPLAY OF A PLURALITY OF SERIES OF NUMERICAL DATA

(76) Inventor: Nicolas Bissantz, Nürnberg (DE)

(*) Notice: Subject to any disclaimer, the term of this patent is extended or adjusted under 35 U.S.C. 154(b) by 587 days.

(21) Appl. No.: 12/878,314

(22) Filed: Sep. 9, 2010

(65) Prior Publication Data

US 2012/0062568 A1     Mar. 15, 2012

(51) Int. Cl.
*G06T 11/20* (2006.01)
*G09G 5/22* (2006.01)

(52) U.S. Cl.
USPC .................................. 345/440; 345/440.1

(58) Field of Classification Search
USPC ........................... 345/440, 440.1, 440.2
See application file for complete search history.

(56) References Cited

U.S. PATENT DOCUMENTS

| | | | |
|---|---|---|---|
| 6,603,477 B1* | 8/2003 | Tittle | 345/440 |
| 2005/0248588 A1* | 11/2005 | Freeman et al. | 345/660 |
| 2009/0027394 A1* | 1/2009 | Chuang et al. | 345/440 |
| 2010/0188427 A1* | 7/2010 | Chuang | 345/660 |

* cited by examiner

*Primary Examiner* — Jeffrey Chow
(74) *Attorney, Agent, or Firm* — Carter, DeLuca, Farrell & Schmidt, LLP

(57) ABSTRACT

A method for the graphical display of a plurality of series of numerical data is provided which includes: determining a smallest and a largest numerical value within each series of numerical data; calculating a relative change between said smallest and said largest numerical value within each series of numerical data; determining a largest relative change out of said relative changes; generating a plurality of graphical representations to be displayed on a display means, wherein each graphical representation is representing one series of numerical data out of the plurality of series of numerical data, the numerical data being represented by indicators in the graphical representation; wherein an interval between a minimum position and a maximum position in a first direction of each graphical representation corresponds to an individual range of numerical values between a minimum value and a maximum value; wherein the value of a numerical data is graphically represented by the position of the corresponding indicator in said interval in the first direction, the method further comprising the step of choosing the minimum value and the maximum value individually for each graphical representation on the basis of said largest relative change and at least one of said smallest and said largest value within the corresponding series.

17 Claims, 2 Drawing Sheets

METHOD FOR THE GRAPHICAL DISPLAY OF A PLURALITY OF SERIES OF NUMERICAL DATA

FIELD OF THE INVENTION

The present invention relates to a method for the graphical display of a plurality of series of numerical data. In particular, the method can be used for the graphical representation of a plurality of time series of numerical data. In particular, a spark line can be used as the graphical representation of each series of numerical data.

RELATED PRIOR ART

Spark lines can e.g. be used to represent the development of the turnover with certain products according to certain criteria, or the development of stock prices over a certain period. For such a graphical display for a plurality of a series of numerical data, it is known to generate a plurality of graphical representations, each graphical representation representing one series of a numerical data out of the plurality of series. In each such graphical representation, the position of an indicator in a first direction graphically represents the value of the data. The position of the indicators in a second direction graphically represents the order of the data, e.g. the time order.

In such graphical representations, the numerical data can be represented on a linear scale or on a logarithmic scale. If the same logarithmic scale is used for all the representations, relative changes within each series of numerical data are represented in each graphical representation by the same interval, such that relative changes are easily comparable between the plurality of series.

FIG. 1 shows two such representations generated according to a prior art method. In the first representation 1, the development of the turnover with a first product called "Precisio" is represented, while in the second representation 2, the development of the turnover with a second product, called "Discus" is represented.

The first direction 3 from bottom to top represents the turnover, while the second direction 4 from left to right represents time. Therefore, the turnover in a certain time period is represented by the position of the indicators 11 and 21 in each graphical representation in the first direction 3, while the respective time period is represented by the position of the indicators 11 and 21 in each graphical representation in the second direction 4.

The value of the turnover is represented on the same logarithmic scale in both representations, such that relative changes are easily comparable between the two representations. However, because both representations use the same minimum and maximum values in the first direction for the range of values to be displayed, and the changes are small with respect to the interval that is displayed, the changes in the values are hard to make out in the representations.

OBJECT OF THE INVENTION

It is an object of the present invention to provide a method for the graphical display of a plurality of series of numerical data in which relative changes within the values of the numerical data in each series are easier to make out from the graphical representations.

As a further object of the present invention, relative changes within each graphical representation should be easily comparable between the graphical representations of the plurality of series.

As a further object of the present invention, the space available for the graphical display should be used a best as possible.

SUMMARY OF THE INVENTION

The present invention provides a method for the graphical display of a plurality of series of numerical data comprising the steps: determining a smallest and a largest numerical value within each series of numerical data; calculating a relative change between said smallest and said largest numerical value within each series of numerical data; determining a largest relative change out of said relative changes; generating a plurality of graphical representations to be displayed on a display means, wherein each graphical representation is representing one series of numerical data out of the plurality of series of numerical data, the numerical data being represented by indicators in the graphical representation; wherein an interval between a minimum position and a maximum position in a first direction of each graphical representation corresponds to an individual range of numerical values between a minimum value and a maximum value; wherein the value of a numerical data is graphically represented by the position of the corresponding indicator in said interval in the first direction, the method further comprising the step of choosing the minimum value and the maximum value individually for each graphical representation on the basis of said largest relative change and at least one of said smallest and said largest value within the corresponding series. In particular, the plurality of series of numerical data is represented on the same display device.

By choosing the minimum value and the maximum value individually for each graphical representation on the basis of at least one of said smallest and said largest value within the series to be represented, it is possible to adjust every graphical representation to the specific series of a numerical data that is to be displayed in this graphical representation. By basing the choice of the minimum value and the maximum value on the largest relative change, it is further possible to make relative changes within the series of a numerical data easily visible.

Because the choice of each minimum value and each maximum value is based on said largest relative change and therefore on at least one common parameter for all the representations, the relative changes within the plurality of series are easily comparable with each other. In particular, a relative change within a first series of numerical data represented in a first representation is easily comparable with a second relative change within a second series of numerical data represented in a second graphical representation.

In one embodiment, the minimum value and the maximum value are individually chosen for each graphical representation on the basis of said largest relative change and at least of one of said smallest and said largest value within the series to be represented on the basis of a rule.

In a further embodiment, the minimum value and the maximum value are individually chosen on the basis of at least one of said smallest and said largest numerical value within the corresponding series of numerical data such that all the numerical data of the series can be represented in the graphical representation.

In a further embodiment the minimum value and the maximum value are individually chosen for each graphical representation such that, if a first relative change of first numerical data represented in a first graphical representation is equal to a second relative change of second numerical data represented in a second graphical representation, a first distance between indicators representing the first data in the first graphical representation is equal to a second distance between indicators representing the second numerical data in the second graphical representation, the first and second distance each being measured relative to the first direction. Thereby, the relative changes within each series of a numerical data are more easily comparable between the plurality of graphical representations.

In a further embodiment, where linear scale is used, the minimum value and the maximum value are individually chosen for each graphical representation such that a ratio of a first relative change of first numerical data represented in a first graphical representation and a second relative change of second numerical data represented in a second graphical representation corresponds to a ratio of a first distance between indicators representing the first data in the first graphical representation and a second distance between indicators representing the second numerical data in the second graphical representation, the first and second distance each being measured relative to the first direction. In particular, the ratio of said first relative change and said second relative change can be equal to the ratio of a said first distance and said second distance. By providing a correspondence between the ratio of the relative changes within a first and a second series to the ratio of the distances by which these ratios are represented in a first and a second representation, the relative changes within each series of a numerical data are easily comparable between the plurality of graphical representations corresponding to the plurality of series of numerical data.

In a particular embodiment, the first data and second data are data out of a first and a second series of numerical data represented in the first and the second representation, respectively, in particular the smallest and the largest value within each series.

In a further embodiment of the invention, the interval between the minimum position and the maximum position in the first direction, i.e. the size of the graphical representation in the first direction, is the same for all the graphical representations. This makes the comparison easier between the plurality of graphical representations.

In a further embodiment, each graphical representation has a second direction, wherein consecutive data in each series are represented by indicators having consecutive positions in said second direction. In particular, the second direction of the graphical representations can represent a position in time, such that each graphical representation represents the development of a value over time in a two-dimensional display.

In a further embodiment of the invention, the minimum value and the maximum value for a graphical representation of a series of numerical data having said largest relative change are chosen as the smallest and the largest value determined for this series. Thereby, the series of numerical data having said largest relative change is displayed in the corresponding graphical representation using the entire interval that is available for representing values in the first direction.

In a further embodiment, the minimum value and the maximum value are individually chosen for each graphical representation on the basis of a first value which corresponds to the absolute change that results in applying said largest relative change to one out of the smallest and the largest value of the respective series represented in each graphical representation.

In a particular embodiment, in which the relative change of two values is calculated with respect to the value having the smaller absolute value, the first value corresponds to the absolute change that results in applying said largest relative change to a value out of the smallest and the largest value having the smaller absolute value.

In an alternative particular embodiment, in which the relative change of two values is calculated with respect to the value having the larger absolute value, the first value corresponds to the absolute change that results in applying said largest relative change to a value out of the smallest and the largest value of the respective series having the larger absolute value.

By using said first value when determining the minimum value and the maximum value for each graphical representation, the graphical representations are easily comparable with respect to the relative change of the series of data to be represented. In particular, this is used when the graphical representation uses a linear scale for the representation of the numerical data.

In particular, the minimum value and the maximum value for a graphical representation of a series of numerical data having a relative change smaller than said largest relative change are chosen such that a difference between the maximum value and the minimum value corresponds to said first value, i.e. to the absolute change that results in applying the largest relative change to the smallest or largest absolute value of the respective series, respectively.

In a further embodiment of the invention, the minimum value and the maximum value for a graphical representation of a series of numerical data having a relative change smaller than said largest relative change are chosen such that the maximum value shows said largest relative change with respect to the minimum value. In particular, this is used when the graphical representation uses a logarithmic scale of the representation of the values of said series.

In a further embodiment, for all series of numerical data which do not have the largest relative change out of all the series, only a part of the interval between the minimum position and the maximum position is necessary to display the series of a numerical data.

Therefore, in a further embodiment of the invention the minimum value and the maximum value for a graphical representation of a series of numerical data having a relative change smaller than said largest relative change are chosen such that an indicator for the smallest value is displayed with a distance to the minimum position in the first direction that is calculated according to a rule.

In a particular embodiment of the invention, the distance is zero.

In a further particular embodiment of the invention, the distance is calculated such that a second distance between the largest value and the maximum value for this series is equal to said distance.

In a further particular embodiment of the invention, the distance is calculated such that a second distance between the largest value and the maximum value for this series is zero.

In a further embodiment of the invention, the numerical data are represented on a logarithmic scale. By representing the values of the series of numerical data on a logarithmic scale, different relative changes within each series are easily comparable.

In a particular embodiment of the invention, the same logarithmic scale is used for all the representations. Thereby, relative changes are easily comparable between the plurality of series, because the same relative changes in two different representations are represented by equal distances in the first direction.

Further, by further choosing the minimum value and the maximum value individually for each graphical representation on the basis of the largest relative change and at least one of said smallest and said largest value within the corresponding series according to the present invention, the space available for displaying said relative changes is optimised in the present invention.

In a particular embodiment of the present invention, the relative change of a first and a second value is calculated on the basis of the difference of the logarithm of the first value and the logarithm of the second value. In a further embodiment of the present invention, the relative change of a first and a second value is calculated on the basis of the ratio of the first and the second value.

In a particular embodiment of the invention, the minimum value and the maximum value for each graphical representation of a series of numerical data are chosen such that their relative change is equal to the largest relative change.

Alternatively, a linear scale can also be used to represent the plurality of numerical data. Therefore, in a further embodiment of the invention, the numerical data are represented on a linear scale.

In a further particular embodiment of the invention, the relative change of a first and a second value is calculated on the basis of the ratio of the first and the second value.

In a further particular embodiment of the invention, the relative change of a first and a second value is calculated on the basis of the ratio of the difference of the first and the second value and the value having the smaller absolute value. In this case, in a particular embodiment, the minimum value and the maximum value for each graphical representation of a series of numerical data are chosen such that their difference is equal to the value that results in multiplying the largest relative change with a value having the smallest absolute value within the respective series.

In a further particular embodiment of the invention, the relative change of a first and a second value is calculated on the basis of the ratio of the difference of the first and the second value and the value having the larger absolute value. In this case, in a particular embodiment, in a particular embodiment, the minimum value and the maximum value for each graphical representation of a series of numerical data are chosen such that their difference is equal to the value that results in multiplying the largest relative change with a value having the largest absolute value within the series.

Thereby, even though a linear scale is used for representing the numerical data, relative changes are easily comparable between the different series.

The present invention further comprises a method for the graphical display of a plurality of series of numerical data comprising the steps: determining a smallest and a largest numerical value within each series of numerical data; calculating a relative change between said smallest and said largest numerical value for each series of numerical data; determining a largest relative change out of said relative changes; generating a plurality of graphical representations to be displayed on a display means, wherein each graphical representation is representing a series of numerical data, the numerical data being represented by indicators in the graphical representation, wherein an interval between a minimum position and a maximum position in a first direction of each graphical representation corresponds to an individual range of numerical values between a minimum value and a maximum value, wherein the value of a numerical data is graphically represented by the position of the corresponding indicator in said interval in the first direction, the method further comprising the steps of: choosing the minimum value and the maximum value individually for each graphical representation on the basis of said largest relative change and at least one of said smallest and said largest value within the corresponding series such that all the numerical data of the series can be represented in the graphical representation, wherein the minimum value and the maximum value are individually chosen for each graphical representation such that, if a first relative change of first numerical data represented in a first graphical representation is equal to a second relative change of second numerical data represented in a second graphical representation, a first distance between indicators representing the first data in the first graphical representation is equal to a second distance between indicators representing the second numerical data in the second graphical representation, the first and second distance each being measured relative to the first direction.

The present invention further comprises a system for the graphical display of a plurality of series of numerical data comprising: first determination means for determining a smallest and a largest numerical value within each series of numerical data, calculation means for calculating a relative change between said smallest and said largest numerical value for each series of numerical data, second determination means for determining a largest relative change out of said relative changes, display generating means for generating a plurality of graphical representations to be displayed on a display means, the display generating means being configured such that each graphical representation is representing a series of numerical data, the numerical data being represented by indicators in the graphical representation, an interval between a minimum position and a maximum position in a first direction of each graphical representation corresponds to an individual range of numerical values between a minimum value and a maximum value, the value of a numerical data is graphically represented by the position of the corresponding indicator in said interval in the first direction, the minimum value and the maximum value are individually chosen for each graphical representation on the basis of said largest relative change according to a rule.

The present invention further comprises a computer program product comprising code for executing a method for the graphical display of a plurality of series of numerical data when the computer program is run on a computer, the method comprising the steps: determining a smallest and a largest numerical value within each series of numerical data; calculating a relative change between said smallest and said largest numerical value for each series of numerical data; determining a largest relative change out of said relative changes; generating a plurality of graphical representations to be displayed on a display means, wherein each graphical representation is representing a series of numerical data, the numerical data being represented by indicators in the graphical representation, wherein an interval between a minimum position and a maximum position in a first direction of each graphical representation corresponds to an individual range of numerical values between a minimum value and a maximum value, wherein the value of a numerical data is graphically represented by the position of the corresponding indicator in said interval in the first direction, wherein the minimum value and the maximum value are individually chosen for each graphical representation on the basis of said largest relative change according to a rule.

SHORT DESCRIPTION OF THE DRAWINGS

DETAILED DESCRIPTION OF PREFERRED EMBODIMENTS OF THE INVENTION

The present invention provides a method for the graphical display of a plurality of series of numerical data, wherein a plurality of graphical representations are generated and displayed on a display means. Each graphical representation generated according to the present invention represents one series of numerical data out of the plurality of series of numerical data to be represented.

Figure 1:
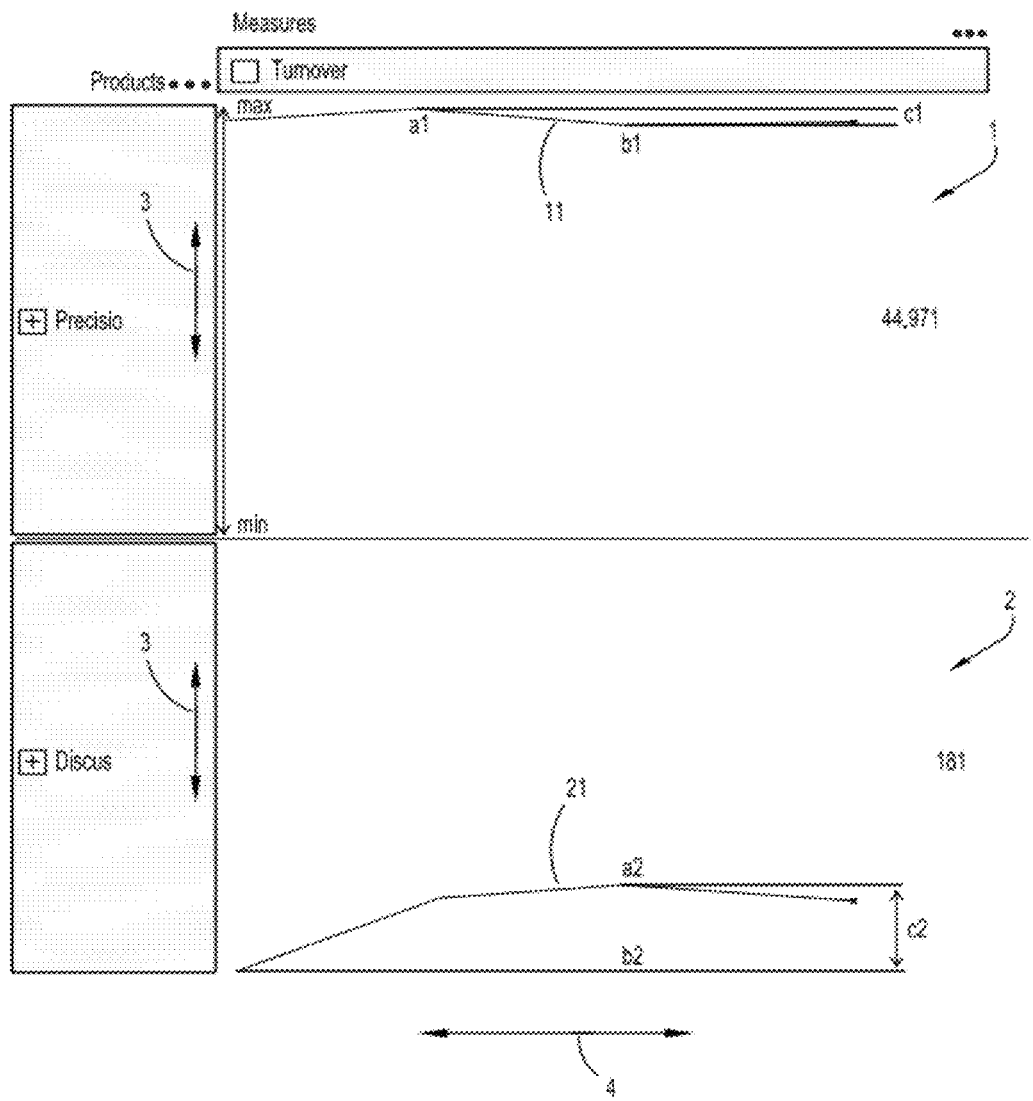
FIG. 1 shows two representations of series of numerical data according to a prior art method.

A first embodiment of the present invention is now described with respect to FIG. 2, which shows a first representation 1 of a first series of numerical data and a second representation 2 of a second series of numerical data displayed one below the other on a display means. The two series of numerical data relate to the turnover with certain products over a certain time period. The two series of numerical data are the same series that are represented in FIG. 1.

For representing the numerical data, indicators 11 and 21 are used. The position of the indicators 11 and 21 in a first direction 3 indicates the value of the numerical data to be displayed. For each representation, the same space in the first direction 3 is available for representing values.

These series of numerical data to be displayed are ordered in some way, usually with respect to time. In the representations 1 and 2, the time order of the data is represented in the second direction 4, which is perpendicular to the first direction 3. Therefore, values which follow each other in time are represented by indicators which follow each other in the second direction 4. Thereby, the development of the values can be represented in a 2-dimensional representation, with time being represented in the second direction 4, and the corresponding values of the numerical data being represented in the first direction 3.

In the embodiment, the first direction 3 from bottom to top represents the size of the turnover, while the second direction 4 from left to right represents time. The turnover in a certain time period is represented by the position of the indicators 11 and 21 in each graphical representation in the first direction 3, the respective time period is represented by the position of the indicators 11 and 21 in each graphical representation in the second direction 4.

For the each graphical representation, the space available in the first direction between a minimum position and a maximum position corresponds to an individual range of numerical values between a minimum value $min1$ or $min2$ and a maximum value $max1$ or $max2$.

The position of the indicator 11 between this minimum position $min1$ and this maximum position $max1$ thereby indicates the value of the numerical data to be represented within the individual range of numerical values that can be represented in the first representation. The same is true for the second representation 2, where the interval between the minimum position and maximum position corresponds to individual minimum and maximum values $min2$ and $max2$ for the second representation.

The present invention is directed to choosing the minimum value and the maximum value individually for each graphical representation 1 and 2 in order to make changes of the values of each graphical representation as visible as possible. Further, the minimum value and the maximum value are chosen in a way that allows an easy comparison between the relative changes represented in each representation.

A first embodiment of such a method for choosing the maximum and the minimum value for each representation is now described. In the first embodiment, a logarithmic scale is used for the representation of the series of numerical data.

In a first step, the numerical data of each series are therefore converted into logarithmic values.

In a second step, a smallest and a largest logarithmic value within each series are determined separately for each series to be represented. For the first series represented in the first representation 1, the smallest value is $\log b1$, while the largest value is $\log a1$. For the second series represented in the second representation 2, the smallest value is $\log b2$, while the largest value is $\log a2$.

In a third step, the relative change between the smallest and the largest logarithmic value determined in the second step is calculated separately for each series to be represented. In the first embodiment, the relative change is calculated as the difference between the largest and the smallest logarithmic value. For the first series represented in the first representation 1, the relative change is $\log a1 - \log b1 = \log c1$. For the second series represented in the second representation 2, the relative change is $\log a2 - \log b2 = \log c2$. Because of the logarithmic scale of the representation, the difference between the logarithmic values corresponds to the logarithm of the ratio of these values. Therefore, $\log c1 = \log a1 - \log b1 = \log a1/b1$.

In a fourth step, the largest relative change is determined out of all the relative changes calculated for all the series of numerical data to be displayed. In the embodiment shown in FIG. 2, the largest relative change is determined out of $\log c1$ and $\log c2$ as $\log Cmax$, i.e. $\log Cmax = \max(\log c1, \log c2)$.

In a fifth step, the minimum and the maximum values corresponding to the minimum and the maximum position in each representation is calculated. For this, in the first embodiment, the largest relative change calculated in the forth step is used in order to determine the intervals of values to be represented in each of the representations such that the relative change between the minimum value and the maximum value in each representation is equal to the largest relative change. Thereby, the largest relative change determined in the fourth step determines the largest change that can be represented in the representations. Because this interval is the same for all the graphical representation, relative changes are represented in all the representations in the same way and are therefore easily comparable.

Figure 2:
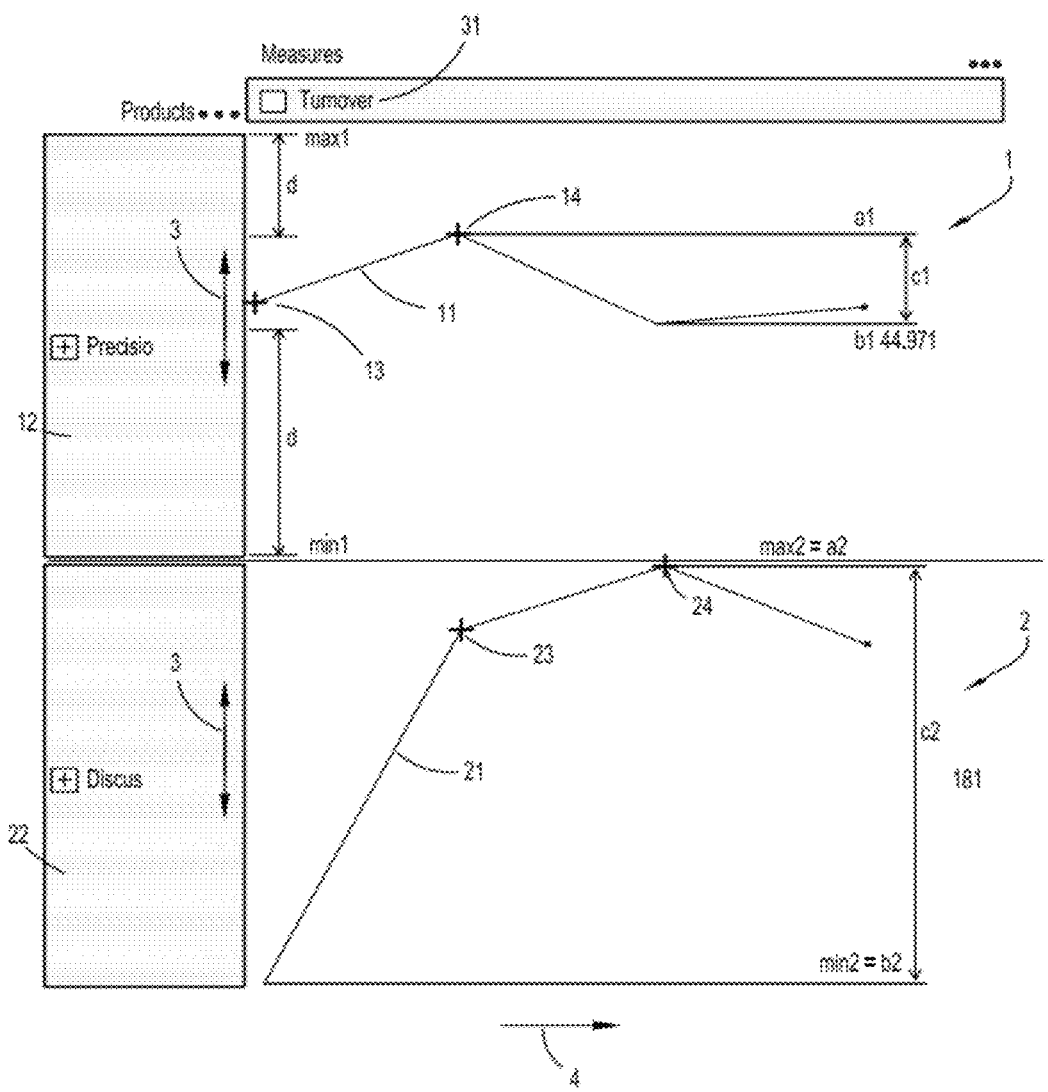
FIG. 2 shows two representations of the same series of numerical data as represented in FIG. 1, the two series being represented according to the present invention.

For the first representation 1 in FIG. 2, the minimum value $min1$ and the maximum value $max1$ are calculated using the largest relative change $\log Cmax$. For the second representation 2, the minimum value $min2$ and the maximum value $max2$ are calculated using the largest relative change $\log Cmax$. These minimum values $min1$ and $min2$ and these maximum values $max1$ and $max2$ are chosen in such a way that the relative change between the minimum value and the maximum value in each representation is equal to the largest relative change, i.e. that $\log max1 - \log min1 = \log Cmax$ and $\log max2 - \log min2 = \log Cmax$.

Further, for the determination of the minimum and the maximum value of each representation, the at least the smallest or the largest value within the series to be represented is used, such that all the data within the series is represented in the respective series. Therefore, the minimum and the maximum value of each representation are chosen such that the minimum value is smaller or equal to the smallest value within the series and the maximum value is equal to or larger than the largest values within the series.

For the series having the largest relative change, the smallest value within the series is used as the minimum value, and the largest value within the series is used as the maximum value. In the embodiment shown in FIG. 2, this is the second series represented in the second representation 2, such that the minimum value $min2$ is equal to the smallest value $b2$, while the maximum value $max2$ is equal to the largest value $a2$.

For those series which have a relative change smaller than the largest relative change, the minimum value and the maximum value are chosen such that the relative change between the minimum value and the maximum value is equal to the largest relative change and that the values of the series lie within the interval between the minimum and the maximum value. As long as all the values within the series lie between the minimum value and the maximum value, the exact position of the series between these values can be chosen in order to provide a desired visual effect.

In a first variant, the values can be arranged at the lower end of the representation, for example by setting the minimum value equal to the smallest value, i.e. min1=b1. Alternatively, the series of numerical data can be arranged at the upper end of the representation, for example by setting the maximum value equal to the largest value within the series, i.e. max1=a1.

In the graphical representation used in the embodiment shown in FIG. 2, the values of the first series are centred with respect to the non logarithmic values min1 and max1. Therefore, the difference d between the minimum value and the smallest value within the series is the same as the difference d between the largest value within the series and the maximum value. Because of the logarithmic scale of the representation, the same absolute difference d is represented with a different size depending on the corresponding relative change associated with such a difference.

In the first representation 1, the minimum value min1 and the maximum value max1 are therefore chosen such that max1−a1=b1−min1. Further, as already described, the maximum and the minimum value max1 and min1 are chosen such that the relative change between the minimum value and the maximum value, equals the largest relative change determined for all the series to be represented, i.e. log max1−log min1=log Cmax.

The differences between a graphical representation according to the present invention as depicted in FIG. 2 and a graphical representation according to prior art methods as depicted in FIG. 1 are now described: In the prior art, the same logarithmic scale and the same minimum and maximum values are used for all the representations. To accommodate all the values to be represented, the logarithmic scale ranges from the smallest value within all the series to the largest values within for all the series to be represented. Therefore, relative changes within each series are hard to see, because they are small in relation to the entire scale that is used.

In contrast to the prior art method shown in FIG. 1, in the method according to the present invention as shown in FIG. 2, individual minimum and maximum values are chosen for each representation, with the interval between the individual minimum and maximum values corresponding only to the largest relative change that has to be represented, while differences in the absolute values between the different series do not enlarge the interval. Thereby, the space available for representation can be used more effectively. In particular, relative changes within each series are easier to make out from the representation according to the present invention because they are bigger in relation to the interval that is represented than in the prior art.

Because the individual interval that is represented in each representation is chosen such that each interval represents the same relative change between the minimum and the maximum value, the relative changes of the series are still easily comparable between the plurality of representations. For example, the indicator 13 in the first representation represents a value of 47,174, while the indicator 14 represents a value of 58,259. The absolute change between these values of 11,086 corresponds to a relative change of 23.5%. In the second representation 2, the indicator 23 corresponds to a value of 192.1, while the indicator 24 corresponds to a value of 237.3. The absolute difference of 45.20 between the two values corresponds to the same relative change of 23.5%. Because the minimum and the maximum values for each representation are chosen such that the same relative changes are represented by the same intervals in the first direction 3, the interval between the indicators 13 and 14 in the first direction has the same size as the interval between the indicators 23 and 24 in the first direction in the second representation. Thereby, relative changes are easily comparable.

The present invention is not limited to logarithmic scales. A second and third embodiment of the present invention, where a linear scale is used instead of a logarithmic one, is now described: Because of the linear scale, it is not necessary to calculate the logarithm of the values of the series to be represented.

Therefore, in a first step, the smallest and the largest value for each series of numerical values is determined. For example, in the first series, a1 is determined as the largest value and b1 is determined as the smallest value.

In a second step, the relative change between the smallest and the largest value for each series of numerical values is calculated.

In the second embodiment, for the relative change, the ratio between the difference of the largest and the smallest value and the value out of these two which has the smaller absolute value is used. For example, in the first series, the relative change according to that second embodiment would be calculated as (a1−b1)/b1.

Alternatively, in the third embodiment, for the relative change, the ratio between the difference of the largest and the smallest value and the value out of these two which has the larger absolute value is used. In this case, in the first series, the relative change according to that third embodiment would be calculated as (a1−b1)/a1

In a third step, the largest relative change is determined out of all the relative changes calculated for the series to be represented. Out of the first and the second series represented in FIGS. 1 and 2, this would be Cmax=(a2−b2)/b2 for the second embodiment and Cmax=(a2−b2)/a2 for the third embodiment.

This largest relative change Cmax is again used to determine the minimum and the maximum values to be represented in each representation.

For this purpose, in the second embodiment, the value out of the smallest and largest value determined for each series having the smaller absolute value is multiplied with the largest relative change Cmax. The minimum value and the maximum value are then chosen such that the difference between the minimum value and maximum values is equal to this value, i.e. max1−min1=b1*Cmax.

In the third embodiment, for this purpose, the value out of the smallest and largest value determined for each series having the larger absolute value is multiplied with the largest relative change Cmax. The minimum value and the maximum value are then chosen such that the difference between the minimum value and maximum values is equal to this value, i.e. max1−min1=a1*Cmax.

Further, in both the second and third embodiment, the minimum and the maximum value are chosen such that all the values of the series lie between the minimum and the maximum value, i.e. min1≤b1 and a1≤max1.

For the series having the largest relative change, the minimum value is therefore chosen such that it is equal to the smallest value, while the maximum value is chosen such that it is equal to the largest value. Therefore, max2=b2 and min2=a2.

For all the other series having a relative change which is smaller than the largest relative change, the exact position of the values to be represented can be determined based on the desired optical effect. Again, as in the logarithmic case, the minimum and the maximum value can for example be chosen such that the values are arranged on the lower or the upper border of the representation, or in the middle of the representation.

Also for the second embodiment, relative changes are represented such that they are easily comparable between the plurality of different representations, because relative changes with respect to the smallest value of each series will be represented in the same way in all the representations. For example, a 50% change in one series will be represented by an interval having half of the size of a 100% change in another series. However, the relative change between the minimum and the maximum value is not necessarily the same for all the representations.

While the preferred embodiments have been described using only two series of numerical data, it is obvious that these embodiments and the present invention can be used in the same way to represent any number of series. In many applications, not only two, but a larger number of series will be represented at the same time, each series being represented by a graphical representation according to the present invention. These graphical representations will usually be displayed at the same time on a display means. For example, the plurality of representations can be arranged in a row.

The method of the present invention can be used in general to represent series of numerical values in a way that relative changes can be easily compared between the series. Further, by individually choosing the minimum and the maximum values for each representation according to a largest relative change determined over all the series to be represented, the display space available is used in a way to make relative changes better visible.

The present invention is particularly suited for representing series of numerical values where the relative changes within each series are relatively small with respect to the differences in the absolute values between the series, as for example is the case with time series of the market price of a plurality of stocks or goods.

The present invention can in particular be used to graphically represent series of numerical values with the help of spark lines. For example, the present invention can be used to represent time series in the form a plurality of spark lines. Further, the present invention can be used to represent time series which are small multiples iterated over dimensional elements or analytic values.

What is claimed is:

1. A method for the graphical display of a plurality of series of numerical data represented on a logarithmic scale comprising the steps:
   determining a smallest and a largest numerical value within each series of numerical data,
   calculating a relative change between said smallest and said largest numerical value within each series of numerical data wherein the relative change of a first and a second value is calculated on the basis of the difference of the logarithm of the first value and the logarithm of the second value or the logarithm of the ratio of the first and the second value,
   determining a largest relative change out of said relative changes,
   generating a plurality of graphical representations to be displayed on a display means, wherein
   each graphical representation is representing one series of numerical data out of the plurality of series of numerical data, the numerical data being represented by indicators in the graphical representation,
   an interval between a minimum position and a maximum position in a first direction of each graphical representation corresponds to an individual range of numerical values between a minimum value and a maximum value,
   the value of a numerical data is graphically represented by the position of the corresponding indicator in said interval in the first direction,
   choosing the minimum value and the maximum value individually for each graphical representation on the basis of said largest relative change and at least one of said smallest and said largest value within the corresponding series.

2. The method according to claim 1, wherein the minimum value and the maximum value are individually chosen on the basis of at least one of said smallest and said largest numerical value within the corresponding series of numerical data such that all the numerical data of the series can be represented in the graphical representation.

3. The method according to claim 1, wherein the minimum value and the maximum value are individually chosen for each graphical representation such that, if a first relative change of first numerical data represented in a first graphical representation is equal to a second relative change of second numerical data represented in a second graphical representation, a first distance between indicators representing the first data in the first graphical representation is equal to a second distance between indicators representing the second numerical data in the second graphical representation, the first and second distance each being measured relative to the first direction.

4. The method according to claim 1, wherein the interval between the minimum position and the maximum position has the same size in the first direction for all the graphical representations.

5. The method according to claim 1, wherein each graphical representation has a second direction, wherein consecutive data in each series are represented by indicators having consecutive positions in said second direction.

6. The method according to claim 1, wherein the minimum value and the maximum value are individually chosen for each graphical representation on the basis of a first value corresponding which corresponds to the absolute change that results in applying said largest relative change to one out of the smallest and the largest value of the respective series represented in each graphical representation.

7. The method according to claim 6, wherein the minimum value and the maximum value for a graphical representation of a series of numerical data having a relative change smaller than said largest relative change are chosen such that a difference between the maximum value and the minimum value corresponds to said first value.

8. The method according to claim 1, wherein the minimum value and the maximum value for a graphical representation of a series of numerical data having said largest relative change are chosen as the smallest and the largest value determined for this series.

9. The method according to claim 1, wherein the minimum value and the maximum value for a graphical representation of a series of numerical data having a relative change smaller than said largest relative change are chosen such that the relative change between the minimum value and the maximum value is equal to said largest relative change.

10. The method according to claim 1, wherein the minimum value and the maximum value for a graphical representation of a series of numerical data having a relative change smaller than said largest relative, change are chosen such that an indicator for the smallest value is displayed with a distance to the minimum position in the first direction that is calculated according to a rule.

11. The method according to claim 10, wherein the distance is zero.

12. The method according to claim 10, wherein the distance is calculated such that a second distance between the largest value and the maximum value is equal to said distance.

13. The method according to claim 10, wherein the distance is calculated such that a second distance between the largest value and the maximum value is zero.

14. The method according to claim 1, wherein the minimum value and the maximum value for each graphical representation of a series of numerical data are chosen such that their relative change is equal to the largest relative change.

15. A method for the graphical display of a plurality of series of numerical data represented on a logarithmic scale comprising the steps:
  determining a smallest and a largest numerical value within each series of numerical data,
  calculating a relative change between said smallest and said largest numerical value for each series of numerical data wherein the relative change of a first and a second value is calculated on the basis of the difference of the logarithm of the first value and the logarithm of the second value or the logarithm of the ratio of the first and the second value,
  determining a largest relative change out of said relative changes,
  generating a plurality of graphical representations to be displayed on a display means, wherein
    each graphical representation is representing a series of numerical data, the numerical data being represented by indicators in the graphical representation,
    an interval between a minimum position and a maximum position in a first direction of each graphical representation corresponds to an individual range of numerical values between a minimum value and a maximum value,
    the value of a numerical data is graphically represented by the position of the corresponding indicator in said interval in the first direction,
  choosing the minimum value and the maximum value individually for each graphical representation on the basis of said largest relative change and at least one of said smallest and said largest value within the corresponding series such that all the numerical data of the series can be represented in the graphical representation,
  wherein the minimum value and the maximum value are individually chosen for each graphical representation such that, if a first relative change of first numerical data represented in a first graphical representation is equal to a second relative change of second numerical data represented in a second graphical representation, a first distance between indicators representing the first data in the first graphical representation is equal to a second distance between indicators representing the second numerical data in the second graphical representation, the first and second distance each being measured relative to the first direction.

16. A system for the graphical display of as plurality of series of numerical data represented on a logarithmic scale comprising:
  first determination means for determining a smallest and a largest numerical value within each series of numerical data,
  calculation means for calculating a relative change between said smallest and said largest numerical value for each series of numerical data wherein the relative change of a first and a second value is calculated on the basis of the difference of the logarithm of the first value and the logarithm of the second value or the logarithm of the ratio of the first and the second value,
  second determination means for determining a largest relative change out of said relative changes,
  display generating means for generating a plurality of graphical representations to be displayed on a display means, the display generating means being configured such that
    each graphical representation is representing a series of numerical data, the numerical data being represented by indicators in the graphical representation,
    an interval between a minimum position and a maximum position in a first direction of each graphical representation corresponds to an individual range of numerical values between a minimum value and a maximum value,
    the value of a numerical data is graphically represented by the position of the corresponding indicator in said interval in the first direction,
    the minimum value and the maximum value are individually chosen for each graphical representation on the basis of said largest relative change according to a rule.

17. A computer program product comprising code tangibly embodied in a computer-readable storage device for executing a method for the graphical display of a plurality of series of numerical data represented on a logarithmic scale when the computer program is run on a computer, the method comprising the steps:
  determining a smallest and a largest numerical value within each series of numerical data,
  calculating a relative change between said smallest and said largest numerical value for each series of numerical data wherein the relative change of a first and a second value is calculated on the basis of the difference of the logarithm of the first value and the logarithm of the second value or the logarithm of the ratio of the first and the second value,
  determining a largest relative change out of said relative changes,
  generating a plurality of graphical representations to be displayed on a display means, wherein
    each graphical representation is representing a series of numerical data, the numerical data being represented by indicators in the graphical representation,
    an interval between a minimum position and a maximum position in a first direction of each graphical representation corresponds to an individual range of numerical values between a minimum value and a maximum value,
    the value of a numerical data is graphically represented by the position of the corresponding indicator in said interval in the first direction,
    the minimum value and the maximum value are individually chosen for each graphical representation on the basis of said largest relative change according to a rule.

* * * * *